US009406007B2

(12) United States Patent
Murata

(10) Patent No.: US 9,406,007 B2
(45) Date of Patent: Aug. 2, 2016

(54) PRINTING SYSTEM, INFORMATION PROCESSING APPARATUS AND PRINTING APPARATUS

(71) Applicant: Brother Kogyo Kabushiki Kaisha, Nagoya (JP)

(72) Inventor: Mareyuki Murata, Kuwana (JP)

(73) Assignee: Brother Kogyo Kabushiki Kaisha, Nagoya-Shi (JP)

(*) Notice: Subject to any disclaimer, the term of this patent is extended or adjusted under 35 U.S.C. 154(b) by 0 days.

(21) Appl. No.: 14/338,449

(22) Filed: Jul. 23, 2014

(65) Prior Publication Data
US 2015/0029549 A1 Jan. 29, 2015

(30) Foreign Application Priority Data
Jul. 23, 2013 (JP) ................................. 2013-153071

(51) Int. Cl.
*G06F 3/12* (2006.01)
*G06K 15/00* (2006.01)
*G06K 15/02* (2006.01)

(52) U.S. Cl.
CPC .......... *G06K 15/4065* (2013.01); *G06F 3/1204* (2013.01); *G06F 3/1205* (2013.01); *G06F 3/1258* (2013.01); *G06K 15/1809* (2013.01); *G06K 15/1823* (2013.01); *G06F 3/1238* (2013.01)

(58) Field of Classification Search
CPC . G06F 3/1204; G06F 3/1238; G06K 15/1809; G06K 15/1823; G06K 15/4065
USPC ......... 358/1.13–1.15, 1.2, 498, 448; 709/201; 399/79, 323
See application file for complete search history.

(56) References Cited

U.S. PATENT DOCUMENTS

| | | | | | |
|---|---|---|---|---|---|
| 5,923,942 | A | * | 7/1999 | Nuggehalli et al. | 399/389 |
| 6,765,685 | B1 | * | 7/2004 | Yu | 358/1.13 |
| 7,355,733 | B2 | * | 4/2008 | Sommer et al. | 358/1.15 |
| 8,406,639 | B2 | * | 3/2013 | Yamanaka | B65H 1/266 399/23 |
| 2005/0105146 | A1 | * | 5/2005 | Tanaka | G03G 15/6508 358/498 |
| 2007/0146776 | A1 | * | 6/2007 | Suzuki | H04N 1/00347 358/1.15 |
| 2008/0055627 | A1 | * | 3/2008 | Ellis | G06F 21/608 358/1.14 |
| 2008/0063424 | A1 | * | 3/2008 | Tanaka | G03G 15/70 399/79 |
| 2008/0084020 | A1 | * | 4/2008 | Nakamura | 270/1.01 |
| 2008/0232835 | A1 | * | 9/2008 | Ota | G03G 15/5087 399/45 |
| 2008/0240833 | A1 | * | 10/2008 | Tabuchi | B41J 3/46 400/605 |

(Continued)

FOREIGN PATENT DOCUMENTS

JP 2002-149365 A 5/2002
JP 2011-187015 A 9/2011

*Primary Examiner* — Negussie Worku
(74) *Attorney, Agent, or Firm* — Burr & Brown, PLLC

(57) ABSTRACT

An image processing apparatus includes a communication unit configured to communicate with a printing apparatus, and a first controller configured to generate a first print job designating one of a plurality of sheet trays of the printing apparatus, and a second print job not designating any one of the plurality of sheet trays of the printing apparatus. A printing apparatus includes an image forming unit, an operation unit, and a second controller configured to determine whether a print job received from the image processing apparatus is the first print job or the second print job. When the first print job is received, the second controller controls the image forming unit to execute the first print job using the sheet tray designated by the first print job, while when the second print job is received, it is executed using a sheet tray designated through the operation unit.

9 Claims, 8 Drawing Sheets

(56) References Cited

U.S. PATENT DOCUMENTS

| | | | | |
|---|---|---|---|---|
| 2008/0290583 A1* | 11/2008 | Kubo | ................ | G03G 15/6508 271/9.01 |
| 2010/0172663 A1* | 7/2010 | Nakai | ................ | G03G 15/5029 399/45 |
| 2010/0295915 A1* | 11/2010 | Karszes | ................ | B41J 3/4073 347/110 |
| 2011/0222108 A1 | 9/2011 | Ozeki | | |
| 2011/0317215 A1* | 12/2011 | Ida et al. | ................ | 358/1.15 |
| 2012/0063833 A1* | 3/2012 | Yanagida | ................ | B41J 13/106 400/582 |
| 2012/0162700 A1* | 6/2012 | Miyazaki | ................ | 358/1.15 |
| 2012/0194832 A1* | 8/2012 | Kitagawa | ................ | H04N 1/00204 358/1.9 |
| 2013/0148144 A1* | 6/2013 | Tao | ................ | G06K 15/16 358/1.12 |
| 2015/0029549 A1* | 1/2015 | Murata | ................ | G06K 15/4065 358/1.15 |

* cited by examiner

PRINTING SYSTEM, INFORMATION PROCESSING APPARATUS AND PRINTING APPARATUS

CROSS-REFERENCE TO RELATED APPLICATION

This application claims priority under 35 U.S.C. §119 from Japanese Patent Applications No. 2013-153071 filed on Jul. 23, 2013. The entire subject matter of the application is incorporated herein by reference.

BACKGROUND

1. Technical Field

The present disclosure relates to a printing system, an information processing apparatus and a printing apparatus. Specifically, the disclosure relates to a technique in selecting sheet trays.

2. Conventional Art

Conventionally, there has been known a printing system (e.g., a PC: a personal computer) having an information processing apparatus and a printing apparatus. The conventional printing system is typically configured such that the image processing apparatus transmits a print job designating a sheet tray to be used when the printing apparatus receives the print job and executes a printing operation. Therefore, the printing apparatus is configured to determine the sheet tray based on the information of the sheet tray included in the print job transmitted from the information processing apparatus.

SUMMARY

The conventional technique described above has a disadvantage as follows. When a user wishes to print using a sheet which is not currently accommodated in any of the sheet trays, it is necessary for the user to move to the printing apparatus and accommodate the desired type of sheets in a sheet tray. In another example, if the user does not know the types of sheets accommodated in respective sheet trays of the printing apparatus, it is also necessary for the user to move to the printing apparatus, and check the types of the sheets accommodated in the plurality of sheet trays.

According to aspects of the invention, there is provided a printing system having an image processing apparatus and a printing apparatus which are communicatably connected with each other, the printing apparatus having a plurality of sheet trays respectively accommodating sheets on which images are to be formed. The image processing apparatus includes a communication unit configured to communicate with the printing apparatus, and a first controller. The first controller is configured to generate a first print job and a second print job to be transmitted to the printing apparatus, the first print job designating one of the plurality of sheet trays of the printing apparatus, the second print job not designating any one of the plurality of sheet trays of the printing apparatus. Further, the printing apparatus includes a communication unit configured to communicate with the image processing apparatus, an image forming unit, an operation unit, and a second controller. The second controller is configured to determine whether a received print job which is received from the image processing apparatus is the first print job or the second print job. When the received print job is the first print job, the second controller controls the image forming unit to form an image, based on the first print job, on a sheet accommodated in the sheet tray designated by the first print job, while when the received print job is the second print job, the second controller controls the image forming unit to form an image, based on the second print job, on a sheet accommodated in a sheet tray which is designated through the operation unit.

According to aspects of the invention, there is also provided an image processing apparatus, which includes a communication unit configured to communicate with a printing apparatus, and a controller which is configured to generate a first print job and a second print job to be transmitted to the printing apparatus through the communication unit, the first print job designating one of a plurality of sheet trays of the printing apparatus to be used when the first print job is executed, the second print job not designating any one of the plurality of sheet trays of the printing apparatus and requiring designation of one of the plurality of sheet trays through the printing apparatus when the first print job is executed.

According to further aspects of the invention, there is provided a printing apparatus, which includes a communication unit configured to communicate with an image processing apparatus, an image forming unit, an operation unit, and a controller. The controller is configured to determine whether a print job which is received from the image processing apparatus through the communication unit is a first print job or a second print job, the first print job including a command designating a sheet tray to be used for printing, the second print job not including the command designating any sheet tray. When the received print job is the first print job, the controller controls the image forming unit based on the first print job on a sheet accommodated in the sheet tray designated by the first print job, while when the received print job is the second print job, the controller controls the image forming unit based on the second print job on a sheet accommodated in a sheet tray which is designated through the operation unit.

BRIEF DESCRIPTION OF THE ACCOMPANYING DRAWINGS

DETAILED DESCRIPTION OF THE EMBODIMENTS

Hereinafter, illustrative embodiments according to the present invention will be described with reference to the accompanying drawings. According to the illustrative embodiments, the printing system includes a PC (personal computer) which generates print jobs, and a printer which executes printing in accordance with the print jobs generating by the PC.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

<Printing System>

Figure 1:
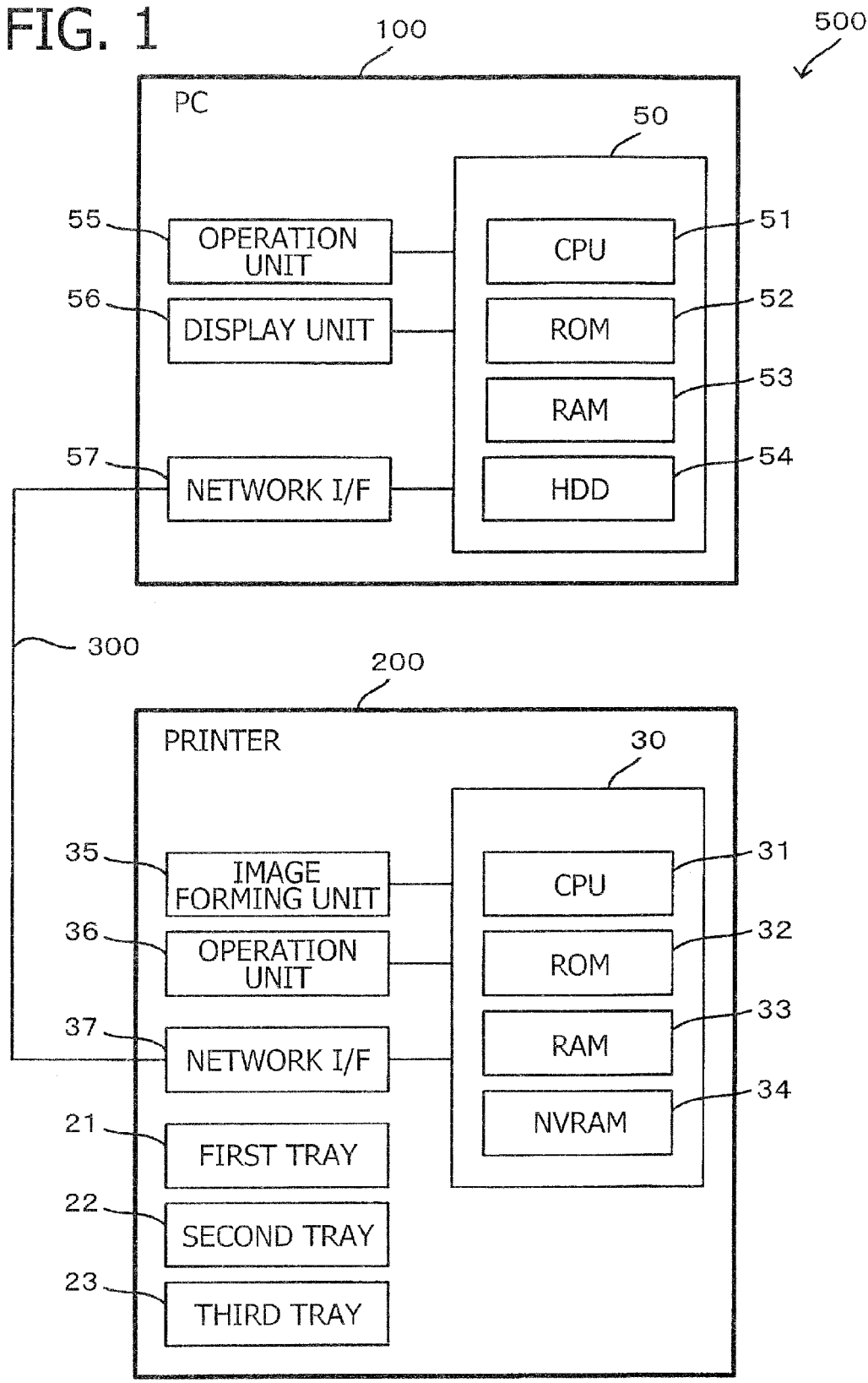
FIG. 1 is a block diagram schematically showing a configuration of a printing system according to an illustrative embodiment of the present invention.

As shown in FIG. 1, a printing system 500 according to an illustrative embodiment has a PC (personal computer) 100 which is configured to generate and output print jobs, and a printer 200 which is configured to receive the print jobs and executes printing (i.e., prints images on sheets) in accordance with the received print jobs. According to the illustrative embodiment, the PC 100 and the printer 200 are connected through a network 300 such as Ethernet (registered trademark) or the like.

It is noted that there is no limitation regarding the number of the printers and PCs configuring the printing system 500. Further, other devices such as information processing devices, image processing devices and the like can be connected to the printing system 500.

<Configuration of PC>

According to the illustrative embodiment, the PC 100 has a controller 50 which includes a CPU (central processing unit) 51 controlling/executing operations of the PC 100, a ROM (read only memory) 52 storing start-up programs (e.g., BIOS: basic input/output system) and the like, a RAM (random access memory) 53 used as a temporary work area when the CPU 51 executes various operations, an HDD (hard disk drive) 54 storing various programs and pieces of data, The controller 50 controls the components of the PC 100. It is noted that the term "controller" 50 is a collective term including hardware (e.g., CPU 51) used to control the PC 100. Thus, the controller 50 does not mean that it is a single hardware component.

The PC 100 includes an operation unit 55 including a keyboard, mouse and the like, a display unit 56, and a network interface 57, which are electrically connected to the CPU 51 and controlled thereby. A network interface 57 is a hardware used to communicate with other devices connected though LAN cables.

The HDD 54 stores an operating system (OS), application programs (e.g., a document creating software, a drawing software, a spreadsheet software, an image data editing software and the like), and a printer driver which controls operations of the printer 200. It is noted that the programs can be installed from recording media such as CD-ROMs or by downloading the same from a server of a network.

The PC 100 is configured such that, when the PC 100 acquires a print instruction through an application program, the PC 100 generates a print job including image data subjected to printing. Then, the PC 100 transmits the thus generated print job to the printer 200. It is noted that the printer connected to the PC 100 should not be limited to the printer 200. If other printers are to be used, printer drivers for other printers may be stored in the PC 100.

<Configuration of Printer>

The printer 200 has a controller 30 which includes a CPU 31 which executes various processes, a ROM 32 storing a boot up program (BIOS) and the like which are executed during a boot up process, a RAM 33 used by the CPU 31 as a temporary work/storage area, and an NVRAM (non volatile RAM) 34 storing various other programs and data. Similar to the "controller 50," the term controller is a general term as the controller 30 may not be a single hardware.

The printer 200 includes an image forming unit 35 which forms an image to be formed on the sheet based on the image data, an operation panel 36 used for acquiring user inputs and/or displaying operation states of the printer 200, and a network interface 37, which are all controlled by the CPU 31. The network interface 37 is a hardware used to communicate with other devices through LAN cables.

The image forming unit 35 according to the illustrative embodiment is configured to print color images. Of course, the printer may be one forming black and white images. Optionally, the image forming method may be an electrophotographic image forming method, or an inkjet printing method.

According to the illustrative embodiment, the printer 200 includes three sheet trays: a first tray 21, a second tray 22, and a third tray 23. When a print job is executed, the printer 200 selects one of the three sheet trays 21, 22 and 23, and starts feeding the sheets from the selected sheet tray. The printer 200 is configured such that the size of the sheets accommodated in each sheet tray is stored in the NVRAM 34. A setting of the sheet size for each tray is input by the user, if a sheet size detection sensor is provided to each sheet tray, the size of the sheets in each sheet tray may be stored based on the output of such sensors. it is noted that the number of the sheet trays needs not be limited to three.

<Print Job>

Next, two types of print jobs to be used in the printing system 500 will be described. According to the illustrative embodiment, the printing system 500 uses two types of print jobs in terms of designation of the sheet tray to be used: a GT-designation print job (i.e., a generating time designation print job which is a print job for which the sheet tray is designated when the print job is generated), which will occasionally be referred to as a first print job and a PT-designation print job (i.e., a printing time designation print job which is a print job for which the sheet try is designated when the print job is executed), which will occasionally be referred to as a second print job. The PC 100 is configured to acquire a user designation of the sheet tray of the printer 200 to be used. In such a case, the GT-designation print job is generated. Otherwise, according to the printing system 500, the user can designate the sheet tray to be used through the printer 200 when the printing operation is executed. In such a case, the PT-designation print job is generated. When the printer 200 receives the PT-designation print job from the PC 100, the printer 200 acquires the user input of the sheet tray to be used, and executes printing the print job using the thus designated sheet tray.

Figure 2:
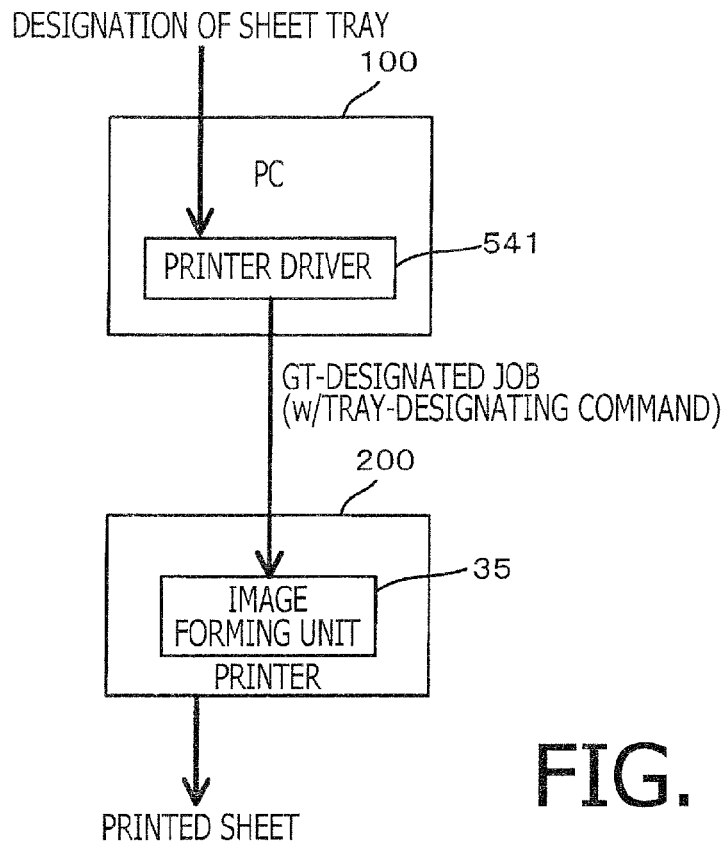
FIG. 2 is a block diagram illustrating a GT-designated print job.

Specifically, when the GT-designation print job is generated, a printer driver 541 installed in the PC 100 acquires a user designation of the sheet tray (FIG. 2). Then, the printer driver 541 adds a tray-designation command, which designates the sheet to be used in the printer, to the print job. Then, the thus generated print job (i.e., GT-designation print job) is transmitted to the printer 200.

Figure 3:
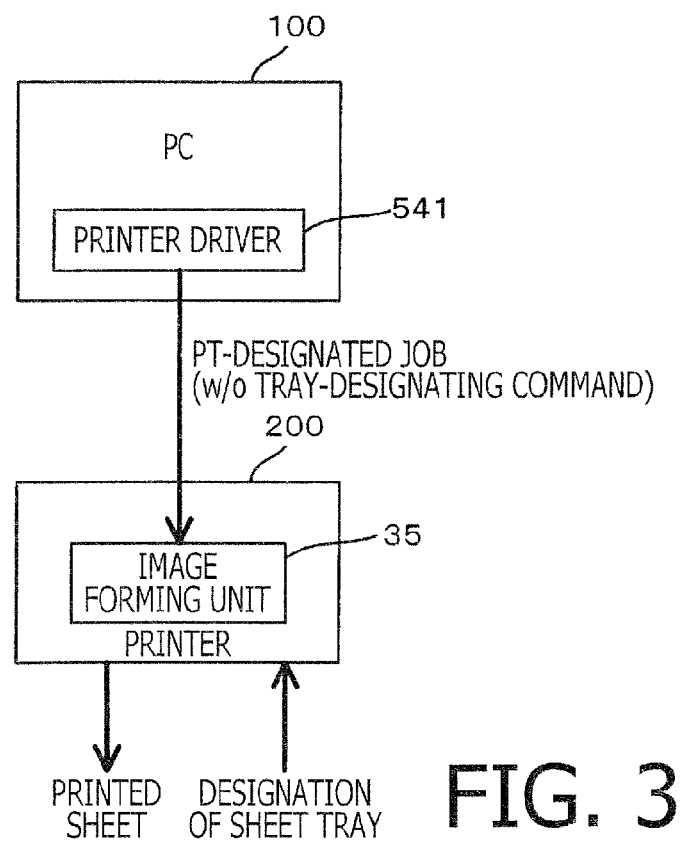
FIG. 3 is a block diagram illustrating a PT-designated print job.

When the printer 200 receives the print job added with the tray-designating command (i.e., the GT-designation print job), the printer 200 determines the sheet tray designated by the sheet designating command as the sheet tray to be used when the received print job is executed, starts feeding the sheets from the thus determined sheet tray, prints images on the sheets, one by one, with the image forming unit 35, and outputs the sheets, When the PT-designation print job is generated, the printer driver 541 does not designate a specific sheet tray, or determines that the sheet tray is to be designated on the printer 200 side. In this case, the printer driver 541 does not add the tray-designating command to the print job, and transmits the print job which is not added with the tray-designating command (i.e., the PT-designation print job) to the printer 200 (FIG. 3).

When the printer 200 receives the PT-designation print job (i.e., the print job to which the tray-designating command has not been added), the printer 200 waits for a user input of tray-designation. When the user inputs the sheet tray to be used through the operation panel 36, the printer 200 determines the thus input sheet tray as the tray to be used when executing the received print job, starts feeding the sheet from the sheet tray, prints an image on the sheet with the image forming unit 35, and outputs the printed sheet.

<Operation of Printing System>

Hereinafter, the printing process executed by the printing system 500 will be described such that processes executed by the PC 100 and by the printer 200 are described separately.

<Print Job Generating Process—Executed by PC>

Figure 4:
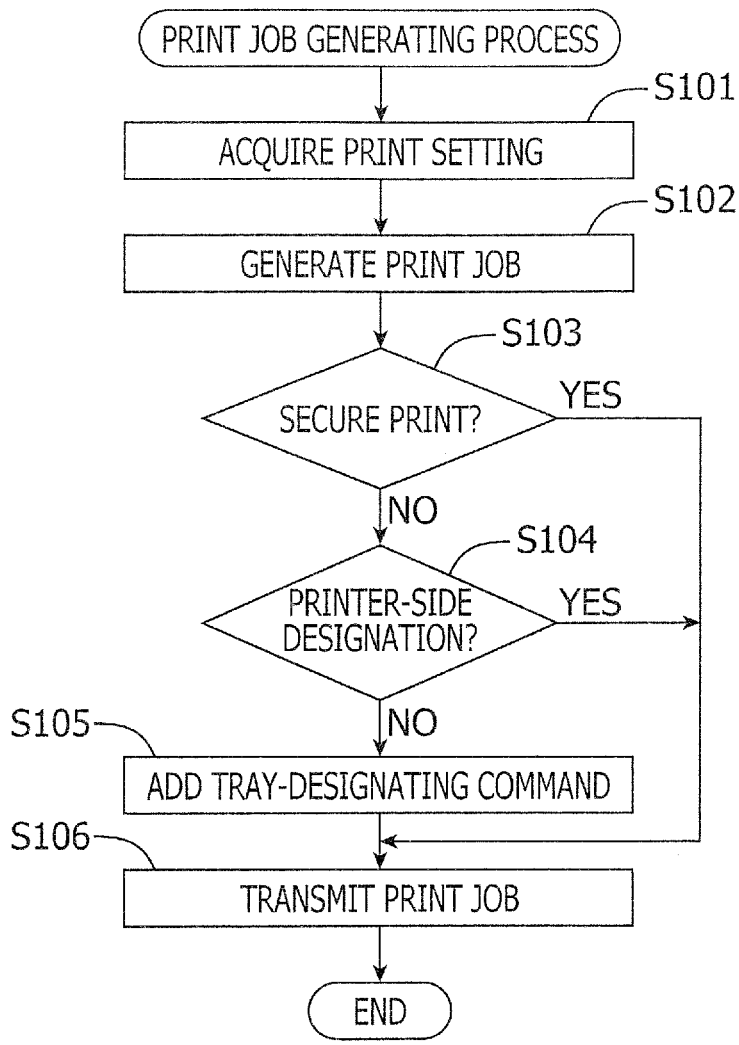
FIG. 4 is a flowchart illustrating a print job generating process executed in a PC (personal computer) according to a first illustrative embodiment.

FIG. 4 shows the print job generating process executed by the PC 100. The CPU 51 starts executing the print job generating process when the printer driver 541 acquires a print instruction through an application program.

When the print job generating process is started, the CPU 51 first acquires a print setting (S101). According to the illustrative embodiment, the print setting is made by a user operation through a print setting screen provided by the printer driver 541 before the user inputs the print instruction. In S101, the CPU 51 acquires the contents of respective setting items of the print setting.

Figure 5:
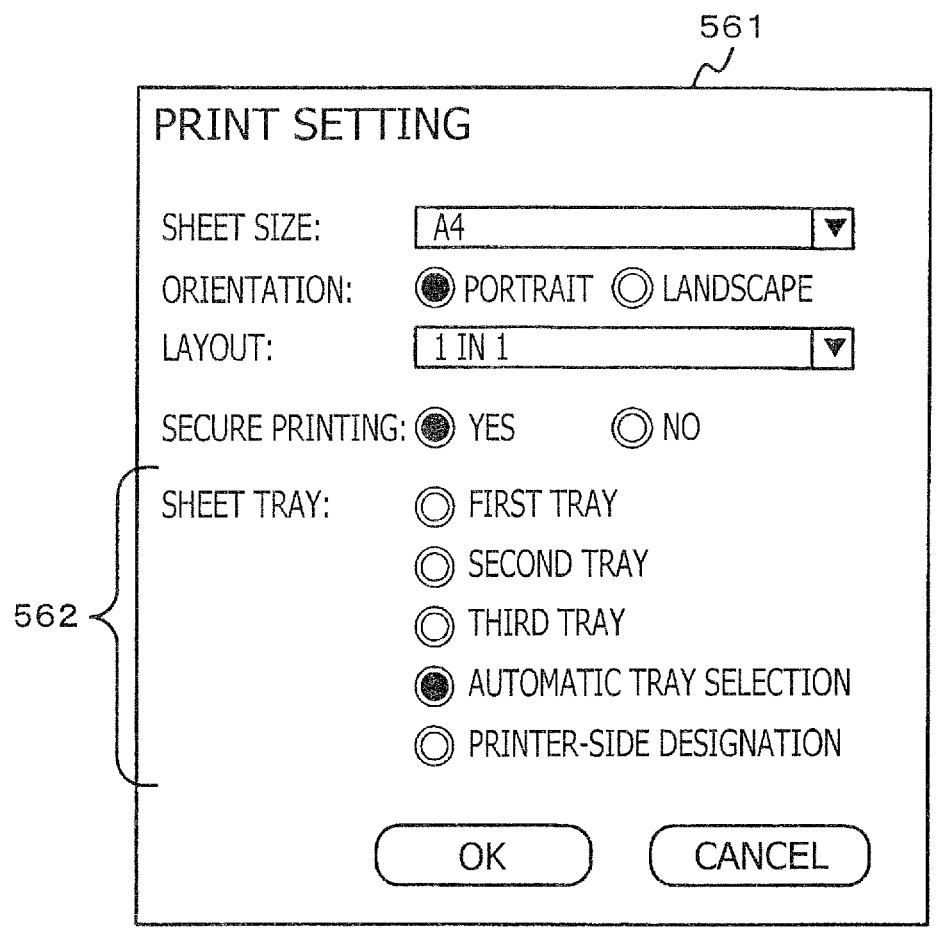
FIG. 5 is an exemplary print setting window displayed on a display of the PC to allow a user to make print setting according to the first illustrative embodiment.

FIG. 5 shows an example of the print setting screen 561 according to the illustrative embodiment. In the print setting screen 561, the user can set a sheet size, an orientation of the sheet, a layout, a secure print setting, and designation of the sheet tray. The secure print is a print operation that requires a user authentication when printing is started. If the user selects "YES" for the secure printing, the print job is transmitted as a secure job. When the printer 200 receives the secure job, it is temporarily stored in a memory (e.g., in the RAM 33 or NVRAM 34) and the printer operates in a standby mode. Thereafter, when the authentication information is input by the user for the secure job, and the authentication is successfully executed, printing of the secure job is allowed.

In a sheet tray selection section, the user can select one of "automatic selection," "printer-side designation," "first tray," "second tray" and "third tray." When the "automatic selection" is selected, the printer driver 541 automatically selects a sheet tray to be used. When the "printer-side designation" is selected, the user designates the tray to be used on the printer side, when the print job is executed.

When the "first tray," "second tray" or "third tray" is selected, the print job is the GT-designation print job. When the "automatic selection" is selected, the printer driver 541 selects the sheet tray, and the print job transmitted to the printer 200 includes the tray-designating command. Therefore, in this case, the print job is also the GT-designation print job. When the "printer-side designation" is selected, the printer 200 acquires user's designation of the sheet tray. Therefore, in this case, the print job is the PT-designation print job.

It is noted that the "automatic selection" may be an operation mode in which the printer 200 automatically selects the sheet tray. Even in this case, the tray to be used is determined by the printer, and the user cannot designate the sheet tray, the print job is regarded as the GT-designated print job.

It is noted that the sheet tray selected when the "automatic selection" is selected may be determined in accordance with any criteria. For example, the sheet tray containing the sheet having the same size as set in the print setting screen 561 may be selected.

After execution of S101, the CPU 51 generates a print job (S102). Specifically, the CPU 51 acquires the print formation instructions based on the image data subject to print, and converts the image formation instructions to a bit map (BMP) image. Then, the CPU 51 generates PDL data based on the BMP image.

After S102, the CPU 51 determines whether the setting of "secure printing" is "YES" or "NO" in S103. When the setting of the "secure printing" is "NO" (S103: NO), the CPU 51 further determines whether the "printer-side designation" is selected as the printer setting (S104). If the "printer-side designation" is not selected (S104: NO), the tray-designating command corresponding to the item of the tray selection is added to the print job (S105). If the "automatic selection" is selected, the CPU 51 firstly determines the sheet tray selected by the printer driver 541, and then adds the tray-designating command corresponding to the determined sheet tray to the print job. If the "automatic selection" is executed on the printer 200 side, the tray-designating command causing the printer 200 to determine the sheet tray is added to the print job. Then, the print job added with the tray-designating command is transmitted to the printer (S106). Thus, the print job added with the tray-designating command is the GT-designation print job.

If the "printer-side designation" is selected (SS104: YES), the printer driver 541 does not need to designate the sheet tray to be used. Therefore, in this case, the printer driver 541 transmits the print job to the printer 200 without adding the tray-designating command (S106). Such a print job (i.e., the print job to which the tray-designating command is not added) is the PT-designation print job.

When the secure printing is executed, the printer 200 does not start printing immediately when the print job is received, but waits for input of user authentication. That is, there would a certain period of time between receipt of the print job and execution of the print job.

During such a waiting period, another print job may be executed and/or the sheets accommodated in the sheet trays may be exchanged or run out. Therefore, it may be advantageous to let the user designate the sheet tray to be used when the secure print job is executed. Therefore, according to the first illustrative embodiment, when the setting of the secure print is "YES" (S103: YES), the CPU 51 transmits the secure print job to the printer 200 without adding the tray-designating command regardless of the tray setting in the print setting screen 561 (S106). That is, if a print job is the secure print job, the CPU 51 transmits the print job to the printer 200 as the PT-designation print job. After execution of S106, the CPU 51 finishes the print job generating process.

<Printing Process—Executed by Printer>

Figure 6:
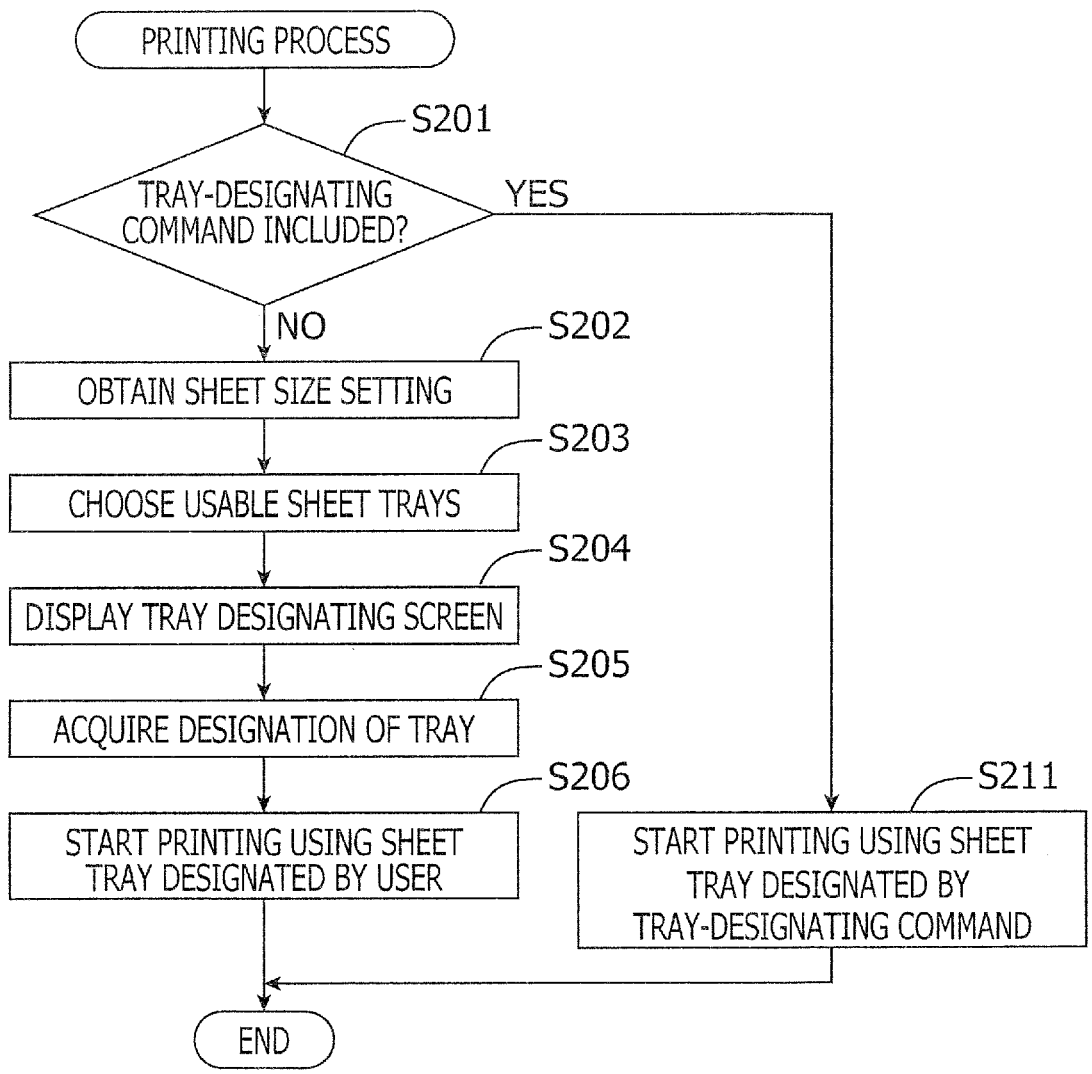
FIG. 6 is a flowchart illustrating a printing process executed by a printer according to the first illustrative embodiment.

A printing process (FIG. 6) is initiated when a print start condition is satisfied on the printer 200. An example of such a condition is that the printer 200 has received a print job when the print job is a GT-designation print job. If the received print job is a PT-designation print job, the condition is that the user has designated a sheet tray to be used on the printer 200. If the received print job is a PT-designation print job or a secure print job, the condition is that the user has done a necessary operation (authentication, and designation of a sheet tray) on the printer 200.

When the printing process has started, the CPU 31 determines whether the print job subjected to printing is a print job added with the tray-designating command (S201). If the tray-designating command is added to the print job (S201: YES), the CPU 31 determines that the print job subjected to be printed is the GT-designation print job. Accordingly, in this case, the CPU 31 starts printing the print job using the sheet tray designated by the tray-designating command (S211). After execution of S211, the CPU 31 finishes the print process.

Figure 7:
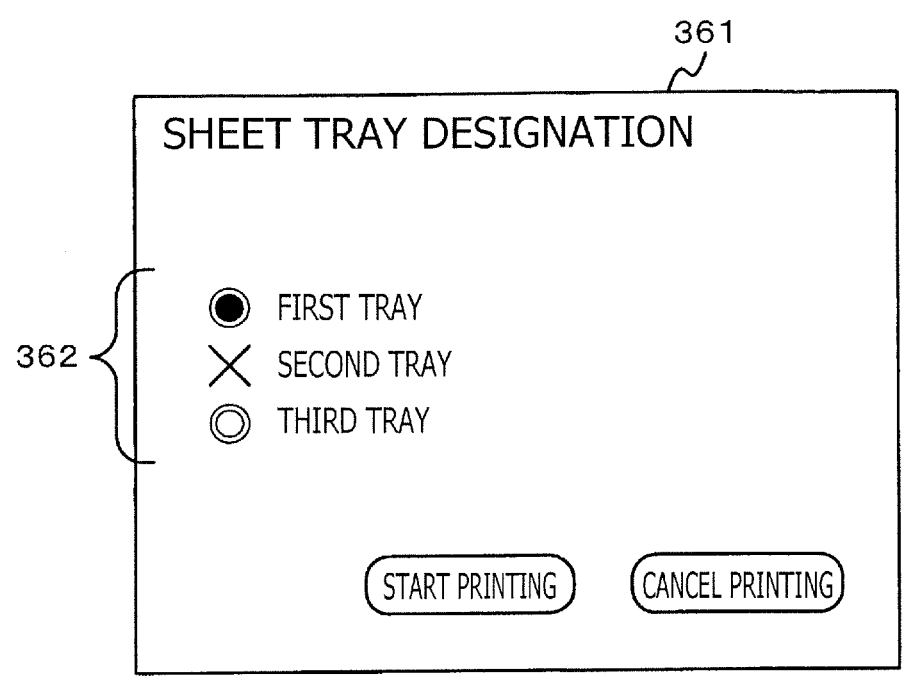
FIG. 7 is an exemplary sheet tray designating window displayed on a display unit of the printer according to the first illustrative embodiment.

When the print job is not added with the tray-designating command (S201: NO), the CPU 31 determines that the print job is the PT-designation print job. In this case, the CPU 31 firstly obtains the sheet size set to the print job subjected to be executed (S202). Then, the CPU 31 determines which of the sheet trays among the sheet trays the printer 200 has and the sheets of the obtained size are accommodated (S203). For example, when the sheet size set in the print job is the letter size, the CPU 31 extracts the sheet trays which accommodate the letter size sheet as the sheet tray to be used for printing, Next, the CPU 31 displays a sheet tray designation screen 361, which allows the user to designate the sheet trays, on the operation panel 36 (S204) as shown in FIG. 7. On the sheet tray designation screen 361, the user can designate the sheet tray to be used. Specifically, in the sheet tray designation screen 361, a list of the sheet trays the printer 200 currently has is displayed in a tray designation section 362, and the used can select one of the listed sheet trays. It is noted that, as shown in FIG. 7, the sheet tray which is not extracted in S203 is indicated with an "X" mark indicating that the tray is not selectable. With such a control, a useless selection can be avoided.

Next, the CPU 31 acquires the user selection of the sheet tray (S205)). Then, in S206, the CPU 31 starts printing using the sheet tray designated by the user which is designated by the user and acquired by the CPU 31 in S206. When the print job is the secure print job, the user authentication may be done before S205, and the designation of the sheet tray may be executed when it is confirmed that the user authentication has been successfully completed.

As described above, according to the first illustrative embodiment, when the printer driver 541 generates a print job, the user is allowed to select whether the designation of the sheet tray to be used for executing the print job is done with the PC 100 or with the printer 200 through the print setting screen 561. Therefore, when the user selects to designate the sheet tray on the printer 200 side, that is, when the PT-designation print job is selected, it is not necessary for the user to know the status of the sheet trays of the printer 200, the print job can be generated and transmitted to the printer 200, and the print job can be executed as the user checks and selects a desired sheet tray through the printer 200.

<Setting Change Process—Executed by PC>

Figure 8:
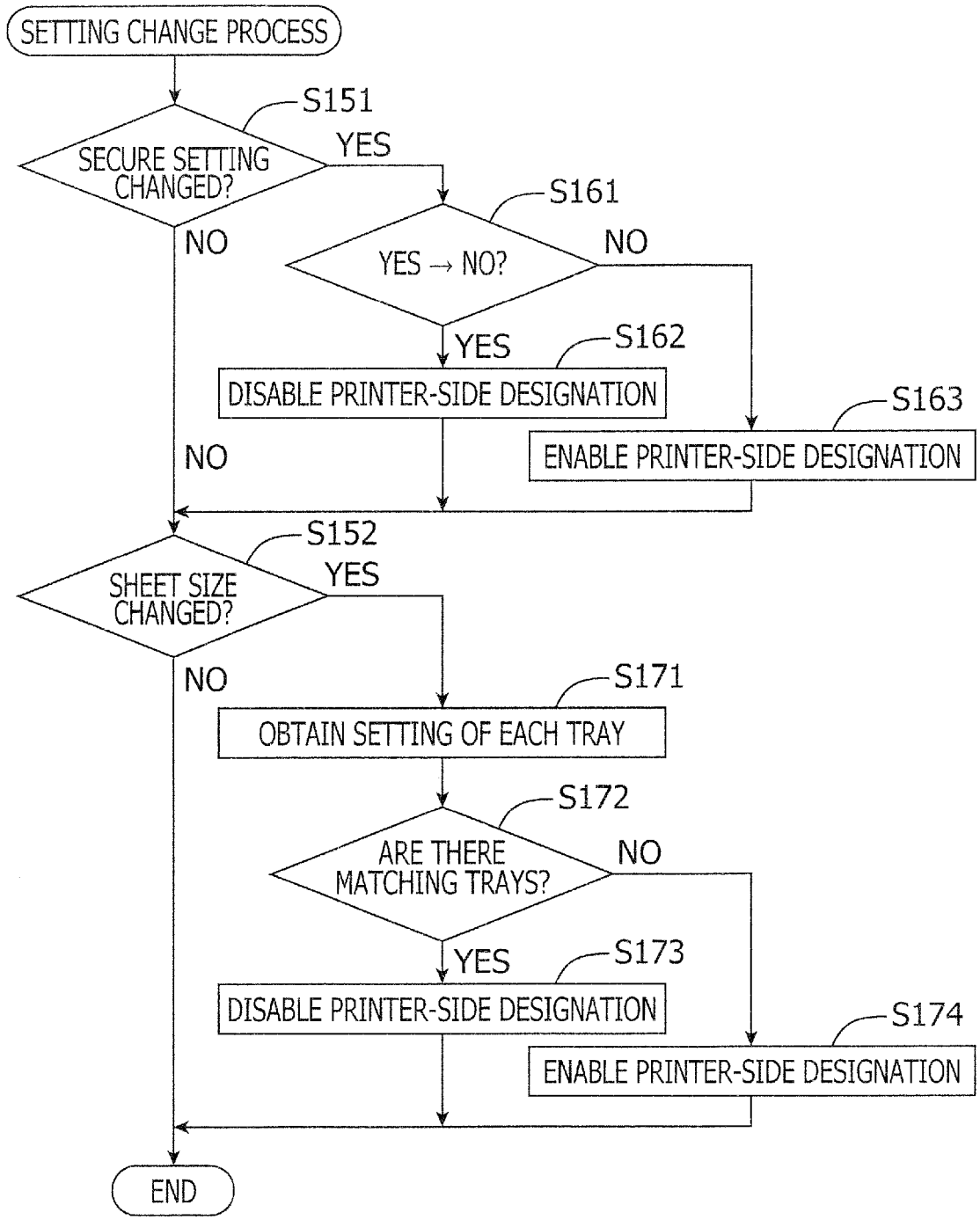
FIG. 8 is a flowchart illustrating a setting change process executed by the PC according to a second illustrative embodiment.

FIG. 8 shows a setting changing process according to a second illustrative embodiment. It is noted that, in the first illustrative embodiment, the selection of the sheet trays in the print setting window 561 is not restricted, while the selection of the sheet trays is restricted in the sheet tray designation window 361. In contrast, according to the setting change process shown in FIG. 8, selection of the sheet trays in the print setting screen 561 is restricted depending on changed setting of other setting items. According to the second illustrative embodiment, after the printer driver 541 displays the print setting screen 561, the print setting screen 561 is updated at every predetermined period (e.g., one second) until an OK button or Cancel button on the print setting screen 561 is clicked by the user.

In the setting change process, firstly, the CPU 51 determines whether a setting of the secure printing has been changed (S151). When the setting of the secure printing has been changed (S151: YES), the CPU 51 further determines whether the change is from "YES" to "NO" (S161).

If the change is from "YES" to "NO" (S161: YES), the CPU 51 disables selection of the setting item of "printer-side designation" (S162). When the setting of the secure printing is changed with the "printer-side designation" being selected, the CPU 51 disables selection of the "printer-side designation" and sets the "automatic selection" to be selected. In contrast, when the change at S161 is from "NO" to "YES" (S161: NO), the CPU 51 enables selection of the "printer-side designation".

When the secure printing is executed, there could be a certain time lag between transmission of the print job and execution of the print job. Therefore, even if the sheet tray is designated when the print job is transmitted, a status of the sheet tray may be changed when the print job is actually executed. According to the second illustrative embodiment, therefore, the print setting screen is configured such that, when the secure printing is executed, the user is allowed to select the "print-side designation" of the sheet tray in addition to the other sheet trays (e.g., the first tray, the second tray, the third tray and the automatic tray selection). Thus, when the user selects an item other than the "printer-side designation", the tray-designating command is added to the print job and transmitted to the printer 200 as the GT-designation print job. If the GT-designation print job is transmitted, it is unnecessary that the printer 200 acquire the user's designation of the sheet tray when the print job is executed. Therefore, in comparison with a case where the PT-designation print job is transmitted, the user can obtain the printed sheets earlier. According to the second illustrative embodiment, as described above, by configuring that the user can select either the GT-designation print job or the PT-designation print job, the printing system becomes convenient to the user in comparison with the conventional printing system.

In contrast, if a print job is expected to be executed as soon as received by the printer 200, the above-described problem (i.e., change of the status of the sheet trays during the time lag) would not occur. Further, non-secure print jobs have lower priority than the secure print jobs. It is advantageous if the non-secure print jobs are processed as soon as the printer 200 receives the same since such print jobs are not stored in the storage of the printer for a relatively long period, load to the memory of the printer 200 can be reduced. Therefore, it is advantageous to restrict designation of the "printer-side designation" if the print job is not the secure printing.

After execution of S162 or S163, or if the secure print setting has not been changed (S151: NO), the CPU 51 determines whether the sheet size has been changed (S152). When the sheet size has been changed (S152: YES), the CPU 51 transmits inquiries asking the printer 200 for the setting of the sheet sizes accommodated in respective sheet trays, and obtains the result (S171).

After S171, the CPU 51 determines whether there is a sheet tray on the printer 200 side, in which the sheet size changed through the print setting screen 561 is accommodated (S172). When there is a sheet tray which meets the sheet size set on the print setting widow 9 (S172: YES), the CPU 51 disables the item of "Printer-side designation" (S173). When the printer 200 does not have a sheet tray accommodating the sheet of which size meets the sheet size set on the print setting screen 561 (S172: NO), the CPU 51 displays the item of "Printer-Side print job" as a selectable item on the print setting screen 561 (S174).

That is, if the sheet tray which accommodates the sheet having the same size as set to the print job is not available in the printer 200, it is likely that the user needs to replace the sheets accommodated in the sheet tray with desired ones. Therefore, by adding the "printer-side designation" in the setting items, the user can select the GT-designation print job or the PT-designation print job, which improves usability. In contrast, if the sheet tray which accommodates the sheet having the same size as set to the print job is available in the printer 200, it is likely that the user selects the sheet tray when the print job is generated, and the above problem may not occur. Therefore, in such a case, it is preferable to restrict selection of the "printer-side designation".

When the sheet size has not been changed after S173 or S174 has been executed (S152: NO), the setting change process is finished.

As described in detail above, according to the print system 500, the PT-side designation print job causing the printer 200 to acquire user designation of the sheet tray is generated. If the PT-side designation print job is transmitted to the printer 200, printing is executed after the print job is transmitted from the PC 100 and the printer 200 acquires the user designation. Therefore, even after the print job has been transmitted, there is a time for the user to check the status of the sheet trays of the printer 200 after the user moves to the printer 200. Therefore, with this configuration, it becomes unnecessary for the user to do troublesome work such as setting of the desired sheets in the sheet tray or checking of the sheets accommodated in the sheet trays before the print job is transmitted.

It is noted that the above-described configurations are of illustrative embodiments of the invention, and are not intended to limit the present invention. The above-described illustrative embodiments can be improved/modified without departing from the scope of the invention. For example, the printer can be replaced with any printing apparatus such as an MFP (i.e., multi-function peripheral) or a copying apparatus having a printing function. Further, the PC can be replaced with any other information processing apparatus such as mobile terminals or a workstation.

Figure 9:
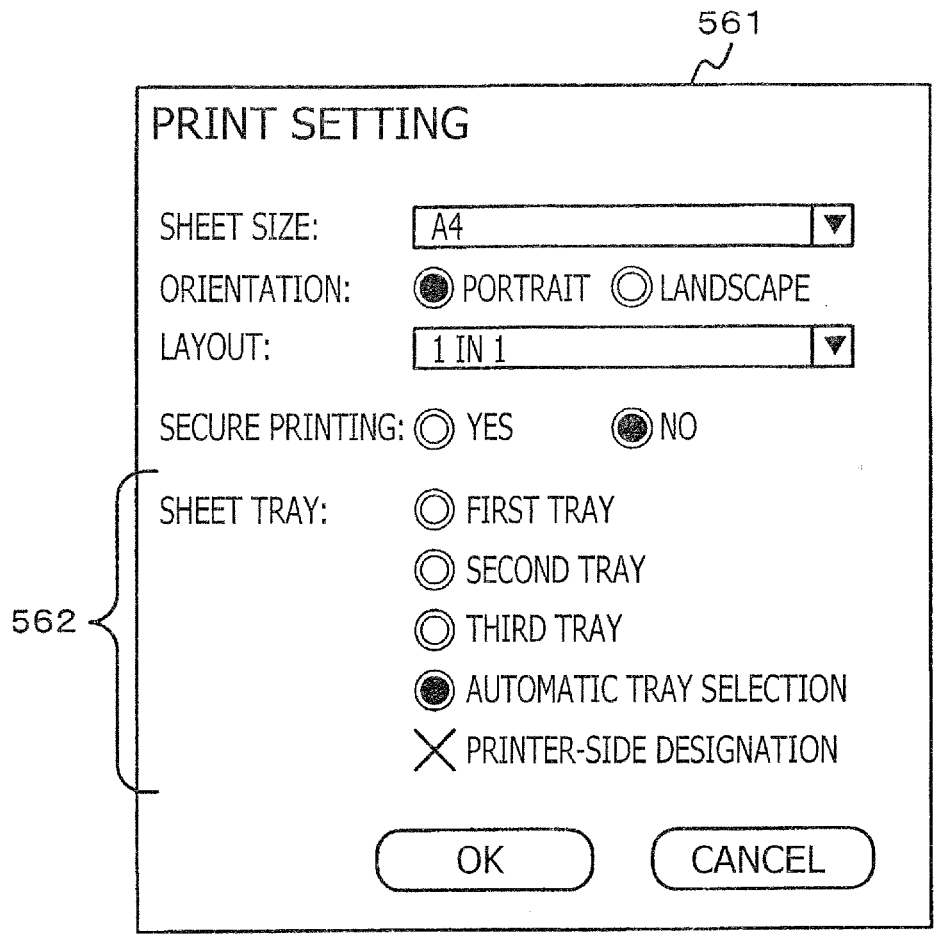
FIG. 9 is an exemplary print setting window displayed on the display of the PC to allow a user to make print setting according to the second illustrative embodiment.

In the illustrative embodiment, the disabled selection items are indicated by showing "X" mark (FIGS. 7 and 9). These are only exemplary indication and the disabled items may be displayed in different ways (e.g., gray-out) or may not be displayed.

In the illustrative embodiments, whether the GT-designation print job or PT-designation print job is determined is based on whether the tray-designating command is added to the print job or not. This configuration is only an exemplary configuration and can be modified in various ways. For example, a particular command may be added to show that a print job is a PT-designation print job, and the print 200 may determine that the print job is the PT-designation print job if the particular command is added to the print job.

In the first illustrative embodiment, the secure print job is transmitted as the PT-designation print job. It is noted that not only the secure print job but another print job may be determined to be the PT-designation print job. For example, if a print job requires a user input on the printer 200 to be executed, such a print job should be treated as the PT-designation print job. An example of such a job may be a storage print job which is a print job once stored in a storage and then printing thereof is executed in response to a user input of a print start instruction.

According to the first illustrative embodiment, when the print job is a predetermined type of print job (e.g., secure print job), the print job is transmitted as the PT-designation print job regardless of the setting of the sheet tray in the print setting screen 561. However, such a decision at S103 may be omitted and whether the GT-designation print job or the PT-designation print job is determined is simply based on the user selection of the sheet tray items 562.

According to the first illustrative embodiment, selection items regarding the sheet trays are displayed on the print setting screen 561, and the user can select whether the GT-designation print job or PT-designation print job is generated based on the user selection of the sheet tray items, It is also possible to omit S104 and whether the GT-designation print job or the PC-designation print job is generated is based on whether the print job is a predetermined print job or not.

Each of the processes may be executed by a single CPU, more than one CPU, hardware such as an ASIC, or combination thereof. Further, each of the processes can be realized by programs which are recorded on a recording medium. Alternatively or optionally, the processes can be provided in the form of methods.

In the illustrative embodiments, a size of the sheet is selectable through the print setting screen 561 (FIGS. 5 and 9), and the size of the sheet is referred to in a decision step in the printing process (FIG, 6) or the setting change process (FIG. 8). However, the invention needs not be limited to such a configuration, and the processes may be modified to use a sheet type which may include a size, a color, a glossy/normal sheet, a thickness, a color of the sheet and the like.

According to the first illustrative embodiment, the second print job is automatically generated when the secure printing is executed. According to the second embodiment, the user can select either the first print job or the second print job when the secure printing is executed, and the first print job should be generated when the secure printing is not executed. If the printer 200 has a relatively large data storage, the second print jobs can be accumulated without causing a shortage of the data storage area. Therefore, in such a case, it may be advantageous to employ the configuration according to the first illustrative embodiment. In contrast, when the printer 200 does not have a large storage area, it is advantageous that the number of accumulated second print jobs is reduced, and it is advantageous to employ the configuration of the second illustrative embodiment.

What is claimed is:

1. A printing system having an image processing apparatus and a printing apparatus which are communicatably connected with each other, the printing apparatus having a plurality of sheet trays respectively accommodating sheets on which images are to be formed, the image processing apparatus comprising:
a first network interface configured to communicate with the printing apparatus; and
a first processor,
the printing apparatus comprising:
a second network interface configured to communicate with the image processing apparatus;
an image forming unit;
an operation unit including a display unit; and
a second processor,
wherein the first processor is configured to:
acquire, from a user, a selection of a first setting value designating a sheet tray or a second setting value indicating that the user will designate a sheet tray to be used through the operation unit;

generate, in response to acquiring the first setting value, a first print job designating one of the plurality of sheet trays to be used in the first print job in accordance with the first setting value, and generate, in response to acquiring the second setting value, a second print job not designating any one of the plurality of sheet trays through the printing apparatus when executing the second print job; and transmit a generated one of the first print job and the second print job to the printing apparatus, and wherein the second processor is configured to:

determine whether a received print job which is received from the image processing apparatus is the first print job or the second print job;

control, in response to receiving the first print job, the image forming unit to form an image, based on the first print job, on a sheet accommodated in the sheet tray designated by the first print job; and control, in response to receiving the second print job, the display unit of the operation unit to display a tray designating screen, acquire a designation of one of the plurality of sheet trays through the operation unit, and control the image forming unit to form an image, based on the second print job, on a sheet accommodated in a sheet tray which is designated through the operation unit.

2. The printing system according to claim 1, wherein:
the first processor is configured to acquire a user instruction to execute a secure printing; and
the acquisition of the second setting value includes the user instruction to execute a secure printing.

3. The printing system according to claim 1, wherein:
the first print job includes a tray-designating command; and
the second print job does not include the tray-designating command.

4. The printing system according to claim 3, wherein:
the second processor determines that the received print job is the first print job when the tray-designating command is included in the received print job; and
the second processor determines that the received print job is the second print job when the tray-designating command is not included in the received print job.

5. The printing system according to claim 1, wherein the first processor is configured to:
acquire user designation of a sheet type;
obtain information of the plurality of trays from the printing apparatus;
determine whether the sheet type designated by the user matches the obtained information; and
enable selection of the second setting value when the sheet type designated by the user does not match the obtained information.

6. The printing system according to claim 1, wherein the first processor is configured to:
acquire user designation of a sheet type;
obtain information of the plurality of sheet trays from the printing apparatus;
determine whether the sheet type designated by the user matches the obtained information; and
disable selection of the second setting value when the sheet type designated by the user matches the obtained information.

7. The printing system according to claim 6, wherein:
the image processing apparatus has a display;
the first processor is configured to display selectable items including the first setting value and the second setting value, the second setting value being displayed but not selectable when the sheet type designated by the user matches the obtained information.

8. An image processing apparatus comprising:
a network interface configured to communicate with a printing apparatus; and
a processor,
wherein the processor is configured to:
acquire, from a user, a selection of a first setting value designating a sheet tray or a second setting value indicating that the user will designate a sheet tray to be used through an operation unit of the printing apparatus; and
generate a first print job and a second print job to be transmitted to the printing apparatus through the network interface,
wherein the first print job, designating one of a plurality of sheet trays of the printing apparatus to be used when the first print job is executed, is generated in response to acquiring the first setting value, and
the second print job, not designating any one of the plurality of sheet trays of the printing apparatus and requiring designation of one of the plurality of sheet trays through the printing apparatus when the second print job is executed, is generated in response to acquiring the second setting value.

9. A printing apparatus having a plurality of sheet trays configured to respectively accommodate sheets on which images are to be formed,
the printing apparatus comprising:
a network interface configured to communicate with an image processing apparatus;
an image forming unit;
an operation unit including a display unit; and
a processor configured to:
determine whether a print job which is received from the image processing apparatus through the network interface is a first print job or a second print job, the first print job including a command designating a sheet tray to be used for executing the first print job, the second print job including a command indicating that a user will designate one of the plurality of sheet trays to be used for executing the second print job through the printing apparatus;
control, when the received print job is the first print job, the image forming unit to form an image, based on the first print job, on a sheet accommodated in the sheet tray designated by the first print job; and
control, when the received print job is the second print job, the display unit of the operation unit to display a tray designating screen, acquire a designation of one of the plurality of sheet trays through the operation unit, and control the image forming unit to form an image, based on the second print job, on a sheet accommodated in a sheet tray which is designated through the operation unit,
wherein the processor determines that the received print job is the first print job when the command designating a sheet tray to be used for executing the first print job is included in the received print job: and
wherein the processor determines that the received print job is the second print job when the command indicating that a user will designate one of the plurality of sheet trays to be used for executing the second print job through the printing apparatus is included in the received print job.

* * * * *